April 6, 1926.

H. P. CLAUSEN

VARIABLE CONDENSER

Filed Nov. 21, 1923

1,579,209

Inventor:
Henry P. Clausen,
by E.W. Adam Atty

Patented Apr. 6, 1926.

1,579,209

UNITED STATES PATENT OFFICE.

HENRY P. CLAUSEN, OF MAMARONECK, NEW YORK, ASSIGNOR TO WESTERN ELECTRIC COMPANY, INCORPORATED, OF NEW YORK, N. Y., A CORPORATION OF NEW YORK.

VARIABLE CONDENSER.

Application filed November 21, 1923. Serial No. 676,029.

*To all whom it may concern:*

Be it known that I, HENRY P. CLAUSEN, a citizen of the United States, residing at Mamaroneck, in the county of Westchester, State of New York, have invented certain new and useful Improvements in Variable Condensers, of which the following is a full, clear, concise, and exact description.

This invention relates to variable condensers, and its object is to provide a unitary variable condenser which has a maximum variable capacity range and which may be adjusted at will to form a variable condenser having a smaller variable capacity range in parallel with a fixed condenser.

In accordance with the general features of the invention, one or more of the movable plates of a rotatable variable condenser is displaced relatively to the remainder of the movable plates so as to enable the rotation of the movable plates over as large a scale for small variations in capacity as they are normally rotated for large variations, thus insuring an exceedingly accurate adjustment for the condenser.

The drawings illustrate one embodiment of the invention.

Figure 1:
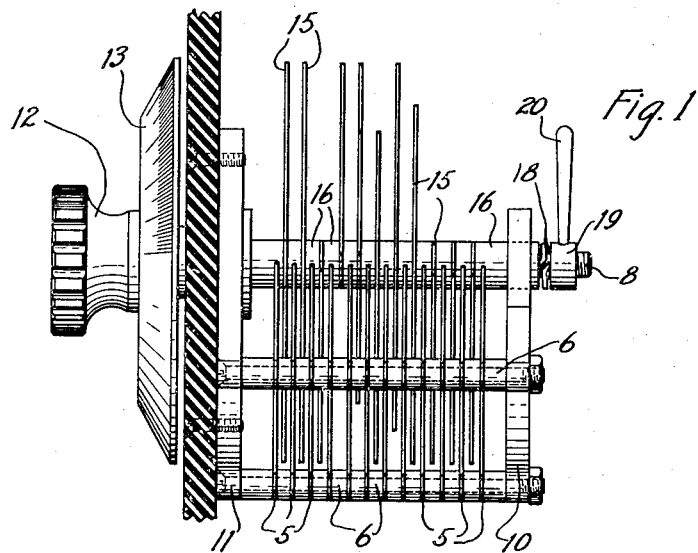
Fig. 1 is a side view of a condenser arranged in accordance with the invention.
Figure 2:
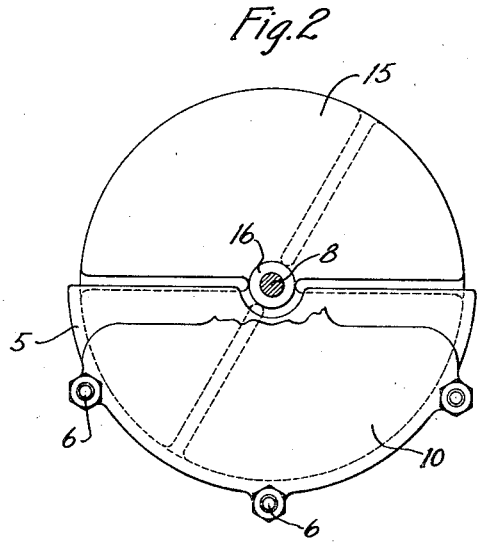
Fig. 2 is a fragmentary transverse section taken at line 2—2 of Fig. 1.
Figure 3:
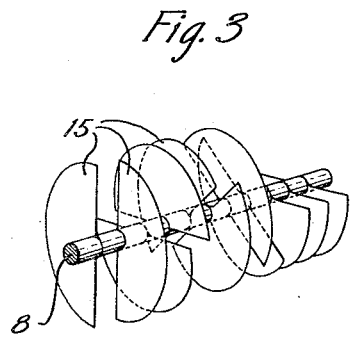
Fig. 3 is a diagrammatic view of the rotary elements of the condenser.

A plurality of plates 5 are fixed to a plurality of posts 6 on one side of a rotary shaft 8. The ends of posts 6 are fastened to a pair of bearing plates 10 and 11 composed in part at least of insulating material. Upon one end of shaft 8 is a knob 12 to rotate the shaft and a disc 13 bearing a calibrated scale to record the amount of rotation of the shaft. A plurality of semicircular plates 15 are mounted loosely upon shaft 8 and are spaced by a plurality of washers 16 so as to lie in planes alternate to the planes occupied by the fixed plates 5. At the end of shaft 8 opposite knob 12 is a spring washer 18 and a locking nut 19 which may be adjusted to tighten the plates 15 and the washers 16 upon shaft 8. To facilitate the adjustment of nut 19, this nut is provided with a handle 20 enabling the easy loosening and tightening of the plates on the shaft 8 at any time.

When it is desired to use the full variable capacity of the condenser, the plates 15 are arranged one directly above the other on shaft 8 and the nut 19 tightened to hold them in this position so that the condenser will operate in the usual manner. When, however, it is desired to make use of less than the full variable capacity of the condenser, one or more pairs of preferably adjacent plates 15 are arranged with the plates thereof angularly displaced in respect to each other in such manner that they will not affect the capacity of the condenser as they are rotated about shaft 8. In this way, the number of effective rotary plates is decreased, and the variable capacity of the condenser reduced, so that the full range of the scale on disc 13 may be used to give the greatest possible accuracy of adjustment for comparatively small variations in capacity.

When more than one pair of rotary plates are arranged as above described, the pairs should be staggered as shown in the drawings so that no continuous gap will be formed at the inner edges of oppositely arranged plates.

While the drawings only shown an arrangement in which one of the plates is displaced at an angle of 180° to the other, it is obvious that when, for example, a smaller reduction in the variable capacity of the condenser is desired, or when for other reasons it is preferable, a similar result may be obtained by displacing one plate of one or more pairs at an angle less than 180°.

The provision of lock nut 19 with the handle 20 enables the ready adjustment of the condenser to suit the conditions under which it operates.

While the description of the invention has been confined to a condenser in which the movable plates are adjusted, it is obvious that in certain types of condensers the invention could be practiced, and the same end could be attained, by varying the relative position of one or more of the fixed plates thereof.

What I claim is:

1. In a condenser, a plurality of stationary plates, a rotary shaft, a plurality of rotatable plates upon said shaft, a variable capacity condenser member including certain of said stationary plates, and certain of said rotatable plates, and a fixed capacity condenser member including the remainder of said stationary plates and the remainder of said rotatable plates.

2. In a condenser, a plurality of stationary plates, a plurality of movable plates, and means to rotate said movable plates in unison, certain of said movable plates being so arranged that the rotation thereof will alter the capacity of the condenser and certain of said movable plates being so arranged that the rotation thereof will not affect the capacity of the condenser.

3. A variable rotary condenser comprising a plurality of semi-circular fixed plates, a rotary shaft, a plurality of semi-circular plates mounted loosely thereon, and a locking means having a handle thereon for locking said movable plates in any desired position about said shaft.

In witness whereof, I hereunto subscribe my name this 19th day of November, A. D. 1923.

HENRY P. CLAUSEN.